S. G. CRANE.
SCALE.
APPLICATION FILED DEC. 24, 1913.
1,214,011.
Patented Jan. 30, 1917.
2 SHEETS—SHEET 2.
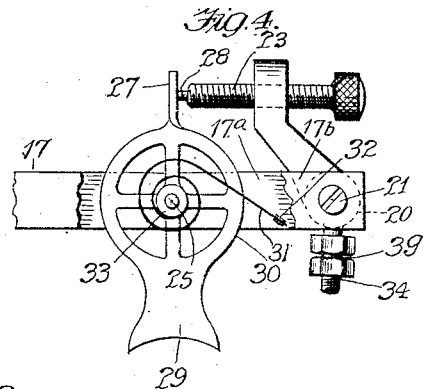
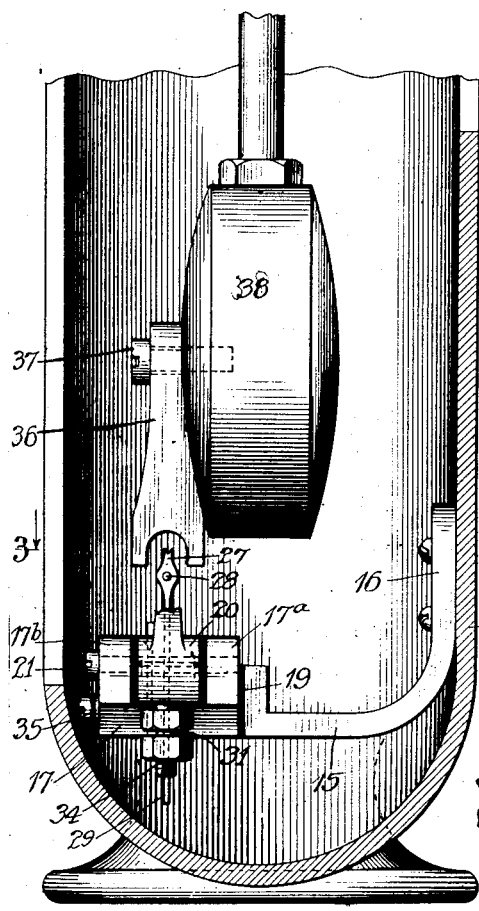
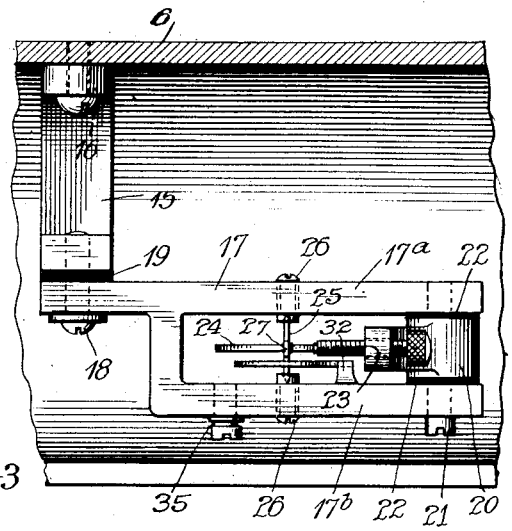
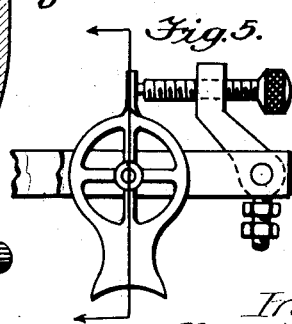
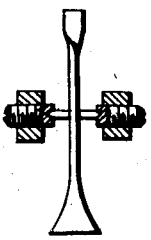
Witnesses
Martin H. Olsen.
Robert Dobberman
Inventor
Samuel G. Crane
By Rector, Hibben, Davis & Macauley
Attys.

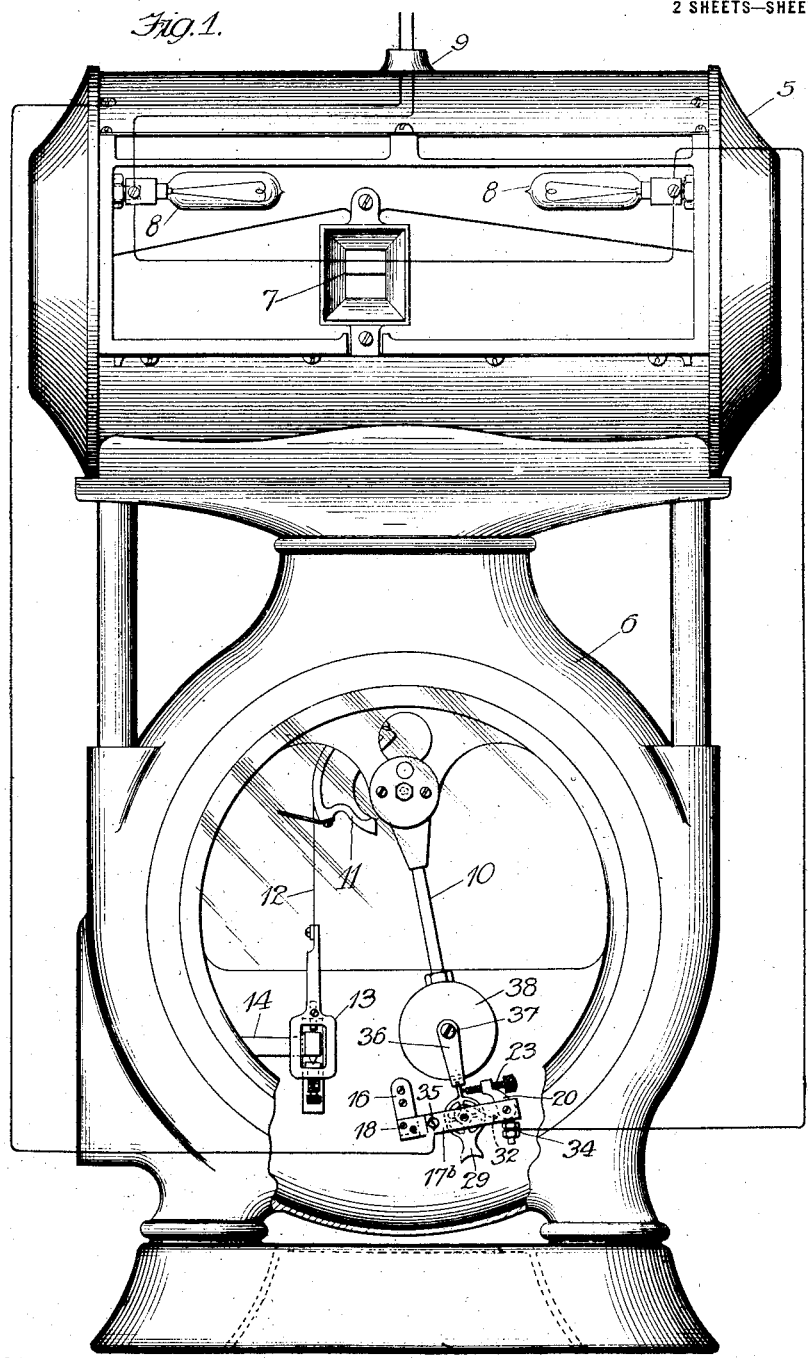

UNITED STATES PATENT OFFICE.

SAMUEL G. CRANE, OF TOLEDO, OHIO, ASSIGNOR TO TOLEDO SCALE COMPANY, OF JERSEY CITY, NEW JERSEY, A CORPORATION OF NEW JERSEY.

SCALE.

1,214,011.

Specification of Letters Patent. Patented Jan. 30, 1917.

Application filed December 24, 1913. Serial No. 808,566.

*To all whom it may concern:*

Be it known that I, SAMUEL G. CRANE, a citizen of the United States, residing at Toledo, county of Lucas, and State of Ohio, have invented certain new and useful Improvements in Scales, of which the following is a specification.

My invention relates more particularly to scales having electric lights arranged to illuminate the chart or other portions thereof and in which the illumination is controlled by the movement of the scale.

In scales heretofore constructed a mechanical switch is normally maintained open by one of the movable parts of the scale pressing against the same and released and permitted to close when such movable part is shifted by the application of a load to the scale pan. In such a construction it is necessary to provide a stop for accurately limiting the movement of the movable scale part, otherwise damage to the switch is apt to result by such part moving too far in the direction of opening the switch. My invention obviates this difficulty by controlling the switch from a movable part of the scale without there being actual contact between such switch and scale part, and the latter is free to move to any extent in either direction without damaging the switch. Furthermore, as will appear from the detailed description of my invention, the switch exerts no pressure whatever upon the movable member of the scale in a direction to cause error in the zero reading.

In the accompanying drawings I have shown my invention applied to a well-known form of pendulum scale and operated in connection with the pendulum thereof, but it will be obvious that it is also applicable to other types of scale and may be applied to other movable parts of a scale whether of the pendulum or any other type; also various changes may be made from the specific form of the device disclosed in the drawings and specification, which disclosure is for the purpose of exemplification only, the scope of the invention being set forth in the following claims in which I have endeavored to distinguish it from the prior art so far as known to me without, however, relinquishing or abandoning any portion or feature thereof.

In the drawings Figure 1 is a rear elevation of a pendulum scale embodying my invention, the casing thereof being partly broken away to better show the construction; Fig. 2 is a section through the casing at right angles to the plane of Fig. 1 showing the interior parts in elevation and on an enlarged scale; Fig. 3 is a plan on the line 3—3 of Fig. 2 and on a similar scale, and Fig. 4 is an enlarged detail in side elevation partially broken away for better disclosure of the construction. Figs. 5 and 6 illustrate a modification of the switch member.

The same reference character is applied to each part throughout the several views.

In the form of scale shown the indicator (Fig. 1) is of the rotary cylindrical type inclosed in a casing 5 mounted upon the pendulum housing 6 and provided with a sight opening 7 through which the indications on the drum may be read. A pair of lamps 8, 8 are arranged adjacent the sight opening in a position to throw their light upon the indicator chart and an outlet 9 is provided for the connection of the scale to service. The switch for the scale in this particular form of my invention is located in the pendulum housing 6 and the circuit for the lamps may be brought into such casing in any desired manner and connected to the terminals of the switch. In Fig. 1 for the sake of simplicity these connections are shown diagrammatically. The pendulum 10 is suitably pivoted and connected by a segment 11, ribbon 12 and stirrup 13 to one end of the scale lever 14 all in the usual manner.

Below the pendulum a bracket 15 attached to the housing at 16 carries a support 17 which is attached thereto by a screw 18 but insulated therefrom at 19. The support 17 is located below but slightly to one side of the pendulum, as best shown in Fig. 2, and cast with two branches 17ª, 17ᵇ between which the parts of the switch are mounted. The stationary contact of the switch comprises a bracket arm 20 preferably of cast metal which is secured between the ends of the forks 17ª, 17ᵇ by a screw 21 extending through said forks and the enlarged end of the bracket, insulating disks 22, 22 being interposed on each side between the bracket and the adjacent fork. At its outer end the bracket is perforated and tapped to receive an adjustable screw contact 23. At a point suitably removed from the bracket the light, movable contact member 24 having an arbor or axle 25 is pivoted between adjustable bearings 26, 26 which are cupped to receive the pointed ends of the arbor. As best seen in Fig. 4 the movable contact may be formed with an upper arm 27 having a contact block 28 of suitable material, a lower pendular portion 29 and an intermediate circular portion 30, the contact 28 being adapted to impinge upon a similar contact block on the end of the stationary contact screw. A hair or other light spring 31 is secured at one end as at 32 to the support and at its other end to a hub or enlargement 33 upon the arbor of the contact member. Said spring tends to maintain the contacts together in an obvious manner. A screw 34 is formed integral with the bracket arm 22 and provided with nuts 39 for securing a wire thereto and a screw 35 furnishes the means of attachment of the other wire of the circuit to the switch. The movable contact is formed in whole or in part of iron or other magnetic material and a permanent magnet 36 is attached by a screw 37 to the pendulum weight 38 and is movable in a path closely adjacent the upper end of the movable contact. As shown the magnet 36 is bifurcated at its lower end and extends partially around the upper portion of the movable contact without touching the same when the pendulum is in its lowest or normal position.

The operation of my improved scale will be apparent. When the pendulum is in its normal position the movable contact member will be held by magnetic attraction away from the stationary contact and by reason of the insulation, above referred to, the circuit through the lamps will be open. When, however, a load upon the platform of the scale causes the pendulum to rise, the hair spring assisted by the magnetic attraction between the magnet and the movable contact will carry the latter against the stationary contact to close the circuit through the lamps which will then be illuminated. Obviously the pendulum carrying the magnet will be unobstructed in its further rise to a position in which it counterbalances the weight upon the scale. When the load is removed from the scale pan and the pendulum returns to normal position it will again pick up the movable contact member and cause it to separate from the stationary contacts and open the circuit. Many changes within the scope of my invention will suggest themselves to those skilled in the art. Thus by making the lower portion of the movable switch member sufficiently heavy and suitably adjusting the stationary contact, the former will return to the closed position without the use of the hair spring. Furthermore, it will be obvious that repulsion between the magnet and the movable member of the switch could be used instead of attraction by suitably magnetizing the parts and that other movable elements of the scale than the pendulum might be used for operating the switch. All these changes, however, as well as many others which it is not necessary to suggest are within the scope of my invention.

I claim:

1. In an automatic weighing and indicating scale having an electric circuit, means for controlling the circuit from a movable element of the scale comprising a switch having a movable contact and means upon a movable member of the scale adapted to move said contact without touching the same.

2. In an automatic weighing and indicating scale having an electric circuit, means for controlling said circuit comprising a switch having a movable contact, magnetic means carried by a movable element of the scale and adapted to affect the movable contact to control its position relative to the stationary contact.

3. In an automatic weighing and indicating scale having an electric circuit, a switch for controlling said circuit comprising a movable contact formed of magnetic material and a magnet secured to a movable part of the scale and adapted to control the position of the movable contact of the switch.

4. In an automatic weighing and indicating scale having an electric circuit, a switch for controlling said circuit comprising a stationary contact and a movable contact, a spring tending to maintain the circuit closed at the switch and a magnet mounted upon a movable part of the scale and normally maintaining the movable contact away from the stationary contact.

5. In a pendulum scale having an electric circuit, a switch having a stationary contact and a movable contact of magnetic material, means tending to maintain the contacts together and a magnet mounted upon the pendulum and maintaining the movable contact away from the stationary contact when the pendulum is in its lower position.

6. In an automatic weighing and indicating scale having an electric circuit, a switch controlling said circuit comprising a support, a stationary contact mounted thereon but insulated therefrom, a movable contact pivoted on the support, a spring for forcing said movable contact toward the stationary contact and a magnet mounted upon a movable part of the scale and adapted to partially surround the movable switch member and maintain it in a position away from the stationary contact.

SAMUEL G. CRANE.

Witnesses:
H. H. BERGEN,
C. W. FESSENDEN.